US010181735B2

(12) United States Patent
Byrne et al.

(10) Patent No.: US 10,181,735 B2
(45) Date of Patent: Jan. 15, 2019

(54) PORTABLE ELECTRICAL POWER UNIT

(71) Applicants: Norman R. Byrne, Ada, MI (US);
Thomas A. Petersen, Sand Lake, MI (US); Jorge A. Givaudan, Las Anguilas (MX); Elizabeth A. Wirgau, Kent City, MI (US)

(72) Inventors: Norman R. Byrne, Ada, MI (US);
Thomas A. Petersen, Sand Lake, MI (US); Jorge A. Givaudan, Las Anguilas (MX); Elizabeth A. Wirgau, Kent City, MI (US)

( * ) Notice: Subject to any disclaimer, the term of this patent is extended or adjusted under 35 U.S.C. 154(b) by 14 days.

(21) Appl. No.: 15/062,944

(22) Filed: Mar. 7, 2016

(65) Prior Publication Data

US 2016/0268825 A1   Sep. 15, 2016

Related U.S. Application Data

(60) Provisional application No. 62/159,848, filed on May 11, 2015, provisional application No. 62/131,501, filed on Mar. 11, 2015.

(51) Int. Cl.
*H02J 7/00* (2006.01)

(52) U.S. Cl.
CPC .......... *H02J 7/0044* (2013.01); *H02J 7/0042* (2013.01); *H02J 7/0068* (2013.01); *H02J 2007/0062* (2013.01)

(58) Field of Classification Search
CPC ........ G06F 1/266; G06F 1/26; B60L 2230/00; H02J 7/0042; Y10T 307/406
USPC .................................................... 307/31, 11
See application file for complete search history.

(56) References Cited

U.S. PATENT DOCUMENTS

| 4,300,087 | A | 11/1981 | Meisner |
| D291,300 | S | 8/1987 | Chaney |
| 5,171,159 | A | 12/1992 | Byrne |
| 5,575,668 | A | 11/1996 | Timmerman |
| 5,814,968 | A | 9/1998 | Lovegreen et al. |
| D408,352 | S | 4/1999 | Tashiro |
| 5,959,433 | A | 9/1999 | Rohde |
| 6,028,267 | A | 2/2000 | Byrne |

(Continued)

FOREIGN PATENT DOCUMENTS

| CN | 202552802 | 11/2012 |
| JP | 2013258886 A | 12/2013 |
| WO | 2013/112185 | 8/2013 |

*Primary Examiner* — Dinh T Le
(74) *Attorney, Agent, or Firm* — Gardner, Linn, Burkhart & Ondersma LLP (57) ABSTRACT

A portable electrical power unit includes a housing defining an interior region that receives a power source, such as a rechargeable battery or capacitor, and one or more electrical connectors that are accessible at or through outer surfaces of the housing. The housing includes a substantially flat base for resting atop generally horizontal surface, and may include a power switch for selectively energizing the outlets. Optionally, a charging indicator provides a visual indication of the current capacity or charge level of the onboard power source. The power unit may receive or convey electrical power via direct-contact electrical terminals or via inductive power transmission, and may include additional features such as a location-detecting circuit operable to detect and generate a signal in the event that the power unit is moved out of a predefined area.

19 Claims, 7 Drawing Sheets

(56) References Cited

U.S. PATENT DOCUMENTS

| | | |
|---|---|---|
| 6,028,413 A | 2/2000 | Brockmann |
| 6,036,516 A | 3/2000 | Byrne |
| 6,290,518 B1 | 9/2001 | Byrne |
| 6,379,182 B1 | 4/2002 | Byrne |
| 6,436,299 B1 | 8/2002 | Baarman et al. |
| 6,756,697 B2 | 6/2004 | Mizutani et al. |
| 6,803,744 B1 | 10/2004 | Sabo |
| 6,967,462 B1 | 11/2005 | Landis |
| 7,149,099 B2 | 12/2006 | Asbery |
| 7,183,504 B2 | 2/2007 | Byrne |
| 7,212,414 B2 | 5/2007 | Baarman |
| 7,222,031 B2 | 5/2007 | Heatley |
| 7,233,222 B2 | 6/2007 | Baarman et al. |
| 7,236,087 B2 | 6/2007 | Vasquez et al. |
| 7,262,700 B2 | 8/2007 | Hsu |
| 7,355,150 B2 | 4/2008 | Baarman et al. |
| 7,392,068 B2 | 6/2008 | Dayan et al. |
| 7,399,202 B2 | 7/2008 | Dayan et al. |
| 7,443,057 B2 | 10/2008 | Nunally |
| 7,465,178 B2 | 12/2008 | Byrne |
| 7,633,263 B2 | 12/2009 | Toya |
| 7,736,178 B2 | 6/2010 | Byrne |
| 7,863,861 B2 | 1/2011 | Cheng et al. |
| 7,878,845 B2 | 2/2011 | Byrne |
| 7,887,113 B2 | 2/2011 | Lambarth et al. |
| 8,061,864 B2 | 11/2011 | Metcalf et al. |
| 8,076,900 B1 * | 12/2011 | Brown .................. F02N 11/14 320/105 |
| 8,106,539 B2 | 1/2012 | Schatz et al. |
| 8,203,307 B2 | 6/2012 | Zick et al. |
| 8,262,244 B2 | 9/2012 | Metcalf et al. |
| 8,283,812 B2 | 10/2012 | Azancot et al. |
| 8,295,036 B2 | 10/2012 | Byrne |
| 8,395,353 B2 | 3/2013 | Wang et al. |
| 8,398,408 B1 | 3/2013 | Hansen et al. |
| 8,421,407 B2 | 4/2013 | Johnson |
| 8,444,432 B2 | 5/2013 | Byrne et al. |
| 8,456,038 B2 | 6/2013 | Azancot et al. |
| 8,480,429 B2 | 7/2013 | Byrne |
| 8,482,160 B2 | 7/2013 | Johnson et al. |
| 8,487,478 B2 | 7/2013 | Kirby et al. |
| 8,497,601 B2 | 7/2013 | Hall et al. |
| 8,558,661 B2 | 10/2013 | Zeine |
| 8,559,172 B2 | 10/2013 | Byrne |
| 8,581,444 B2 | 11/2013 | Urano |
| 8,618,695 B2 | 12/2013 | Azancot et al. |
| 8,624,750 B2 | 1/2014 | Azancot |
| D701,830 S | 4/2014 | Edwards |
| 8,721,124 B2 | 5/2014 | Byrne et al. |
| 8,937,407 B2 | 1/2015 | Byrne et al. |
| 8,951,054 B2 | 2/2015 | Byrne et al. |
| 9,000,298 B2 * | 4/2015 | Byrne .................. H02G 3/081 174/66 |
| 9,148,006 B2 | 9/2015 | Byrne et al. |
| 9,362,764 B2 | 6/2016 | Farkas et al. |
| 9,385,549 B2 | 7/2016 | Miller et al. |
| 9,438,070 B2 | 9/2016 | Byrne et al. |
| 9,484,751 B2 | 11/2016 | Byrne et al. |
| 9,513,682 B2 * | 12/2016 | Fleisig .................. G06F 1/26 |
| 9,543,692 B2 * | 1/2017 | Shomali ............ H01R 13/5224 |
| 9,608,455 B2 | 3/2017 | Byrne et al. |
| 2002/0171335 A1 | 11/2002 | Held |
| 2003/0048254 A1 | 3/2003 | Huang |
| 2003/0202317 A1 | 10/2003 | Jans |
| 2004/0026998 A1 | 2/2004 | Henriott et al. |
| 2004/0150934 A1 | 8/2004 | Baarman |
| 2004/0189246 A1 | 9/2004 | Bulai et al. |
| 2005/0209933 A1 | 9/2005 | Thompson |
| 2005/0225292 A1 | 10/2005 | Damlamian et al. |
| 2006/0159064 A1 * | 7/2006 | Harnois ................ H04L 41/082 370/352 |
| 2007/0182367 A1 | 8/2007 | Partovi |
| 2007/0279002 A1 | 12/2007 | Partovi |
| 2008/0001572 A9 | 1/2008 | Baarman et al. |
| 2008/0079392 A1 | 4/2008 | Baarman et al. |
| 2008/0166965 A1 | 7/2008 | Greene et al. |
| 2008/0169910 A1 | 7/2008 | Greene et al. |
| 2008/0200050 A1 | 8/2008 | Byrne |
| 2008/0262932 A1 | 10/2008 | Wareham |
| 2009/0045772 A1 | 2/2009 | Cook et al. |
| 2009/0156061 A1 * | 6/2009 | Bernstein ............ H01R 13/652 439/652 |
| 2009/0212636 A1 | 8/2009 | Cook et al. |
| 2009/0212638 A1 | 8/2009 | Johnson |
| 2009/0230777 A1 | 9/2009 | Baarman et al. |
| 2009/0271048 A1 | 10/2009 | Wakamatsu |
| 2009/0278494 A1 | 11/2009 | Randall |
| 2010/0007307 A1 | 1/2010 | Baamian et al. |
| 2010/0038970 A1 | 2/2010 | Cook et al. |
| 2010/0052431 A1 | 3/2010 | Mita |
| 2010/0127660 A1 | 5/2010 | Cook et al. |
| 2010/0187913 A1 | 7/2010 | Smith et al. |
| 2010/0201201 A1 | 8/2010 | Mobarhan et al. |
| 2010/0244584 A1 | 9/2010 | Azancot et al. |
| 2010/0259401 A1 | 10/2010 | Azancot et al. |
| 2010/0290215 A1 | 11/2010 | Metcalf et al. |
| 2010/0308665 A1 | 12/2010 | Itkonen |
| 2010/0321939 A1 | 12/2010 | Patel |
| 2011/0006611 A1 | 1/2011 | Baarman et al. |
| 2011/0062789 A1 | 3/2011 | Johnson et al. |
| 2011/0121660 A1 | 5/2011 | Azancot et al. |
| 2011/0175544 A1 | 7/2011 | Jong |
| 2011/0193417 A1 | 8/2011 | Hirasaka et al. |
| 2011/0241607 A1 | 10/2011 | Wiegers |
| 2011/0241614 A1 | 10/2011 | Yeh |
| 2011/0248575 A1 | 10/2011 | Kim et al. |
| 2011/0260548 A1 | 10/2011 | Urano |
| 2011/0305056 A1 | 12/2011 | Chien |
| 2012/0113576 A1 | 5/2012 | Cooper et al. |
| 2012/0113645 A1 | 5/2012 | Liao et al. |
| 2012/0117730 A1 | 5/2012 | Lemire et al. |
| 2012/0153731 A9 | 6/2012 | Kirby et al. |
| 2012/0206097 A1 | 8/2012 | Soar |
| 2012/0228953 A1 | 9/2012 | Kesler et al. |
| 2012/0235474 A1 | 9/2012 | Mannino et al. |
| 2012/0261998 A1 | 10/2012 | Sato |
| 2012/0299539 A1 | 11/2012 | Jones et al. |
| 2012/0312196 A1 | 12/2012 | Newkirk |
| 2013/0049482 A1 | 2/2013 | Rofe et al. |
| 2013/0057203 A1 | 3/2013 | Jones et al. |
| 2013/0141038 A1 | 6/2013 | Papa |
| 2013/0175986 A1 | 7/2013 | Senatori |
| 2013/0200717 A1 | 8/2013 | Bourilkov et al. |
| 2013/0207478 A1 | 8/2013 | Metcalf et al. |
| 2013/0234481 A1 | 9/2013 | Johnson |
| 2013/0285606 A1 | 10/2013 | Ben-Shalom et al. |
| 2014/0098525 A1 * | 4/2014 | Bennett ................ H02J 7/0052 362/183 |
| 2014/0191568 A1 * | 7/2014 | Partovi .................. H02J 7/025 307/9.1 |
| 2014/0195336 A1 | 7/2014 | Dublin, III et al. |
| 2014/0335919 A1 | 11/2014 | Stewart et al. |
| 2014/0361633 A1 | 12/2014 | Abe |
| 2015/0008879 A1 | 1/2015 | Schneider et al. |
| 2015/0015182 A1 | 1/2015 | Brandtman et al. |
| 2016/0050375 A1 * | 2/2016 | Soffer .................. H04N 5/268 348/445 |

* cited by examiner

PORTABLE ELECTRICAL POWER UNIT

CROSS REFERENCE TO RELATED APPLICATION

The present application claims the priority benefit of U.S. provisional application Ser. No. 62/131,501, filed Mar. 11, 2015, and of U.S. provisional application Ser. No. 62/159,848, filed May 11, 2015, which are hereby incorporated herein by reference in their entireties.

FIELD OF THE INVENTION

The present invention relates to electrical power supplies and, more particularly, to portable electrical power supplies having rechargeable batteries or the like.

BACKGROUND OF THE INVENTION

Portable battery-equipped electrical supplies are used to provide a convenient but limited supply of electrical power at various locations that may be separated from traditional wired power supplies.

SUMMARY OF THE INVENTION

The present invention provides a portable electrical power unit that can be placed atop work surfaces, tables, desks, and the like, and which contains its own rechargeable battery or other power source to provide at least a limited amount of electrical energy for charging portable phones, handheld computers and media players, and other small electrical or electronic devices. The power unit may include several electrical connectors that allow multiple devices to be charged or supplied with power simultaneously, and may include a power switch to selectively energize and de-energize the electrical receptacles. Optionally, the power unit includes a charge level indicator that provides a visual indication of the capacity remaining in the onboard power source (e.g. a battery, capacitor, or the like). In some embodiments, the power unit is sufficiently small to be carried in a handbag, briefcase, or the like, and it is further envisioned that restaurants and other administrators of commercial establishments or gathering places may maintain a set of charged power units that can be loaned to customers or patrons on a short term basis, such as during a meal.

According to one form of the present invention, a portable electrical power unit includes a housing, an electrical connector, an electrical power source, and a power switch. The housing defines an interior region, and further defines an electrical outlet opening through which the electrical connector is accessible. The electrical connector is mounted in the interior region of the housing, as is the electrical power source. The electrical power source is in electrical communication with the electrical connector via the power switch, whereby the power switch is operable to selectively energize and de-energize the electrical connector.

In one aspect, the electrical power unit includes a charging connector or port that is spaced from the electrical connector, and is accessible through the housing, for receiving a charging connector of an outside power supply, and to enable recharging the electrical power source inside the housing. For example, the electrical power source may be a battery or a capacitor.

In another aspect, the power switch includes a charged level indicator that provides a visual indication of a charge level of the electrical power source. Optionally, the charge level indicator is in the form of an annular ring, where the ring can illuminate in whole or in part, in a manner that corresponds to the charge level of the power source. For example, one half of the annular ring may illuminate to indicate that the electrical power source holds approximately 50% charge. Optionally, the annular ring is made up of a plurality of individually-energizable LED lamps arranged in a circle. Optionally, the power switch includes a depressible central region of the annular ring, or a separate button or depressible portion.

In a further aspect, the power unit receives or conveys electrical power via direct-contact electrical terminals or via inductive power transmission, such as at or through its bottom and top surfaces.

Thus, the portable electrical power unit of the present invention provides a readily transportable source of electrical energy for charging or energizing small electrical or electronic devices, which is suitable for placing atop a table, desk, or even in a vehicle or outdoor area, such as to provide a limited amount of backup electrical power for use by small devices.

These and other objects, advantages, purposes and features of the present invention will become apparent upon review of the following specification in conjunction with the drawings.

DESCRIPTION OF THE PREFERRED EMBODIMENTS

Referring now to the drawings and the illustrative embodiments depicted therein, a portable electrical power unit 10 includes a housing 12 that is configured for mounting or placing atop a table, work surface, or substantially any horizontal surface where a portable power source may be desired. Housing 12 defines an interior region in which an electrical power source (not shown), such as a battery or capacitor, is mounted. Preferably, the electrical power source is protected and/or designed against damage, spillage, or venting in any orientation, and may be mounted or supported in a shock-resistant manner, such as to resist damage from dropping from common table heights, for example. Power unit 10 includes at least one electrical connector 14, such as a low voltage USB connector (shown), mini-USB, or micro-USB, and may include two or more electrical connectors of the same or different configurations, as desired. In the illustrated embodiment, power unit 10 includes three electrical connectors 14 on respective sides of housing 12, plus a power switch 16 on a fourth side, the power switch optionally including a charge level indicator 18 (FIGS. 2-5, 6, 11A and 11B), as will be described in more detail below.

Figure 1:
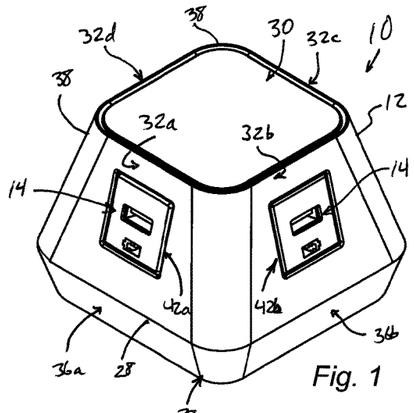
FIG. 1 is a perspective view of a portable electrical power unit in accordance with the present invention.
Figure 2:
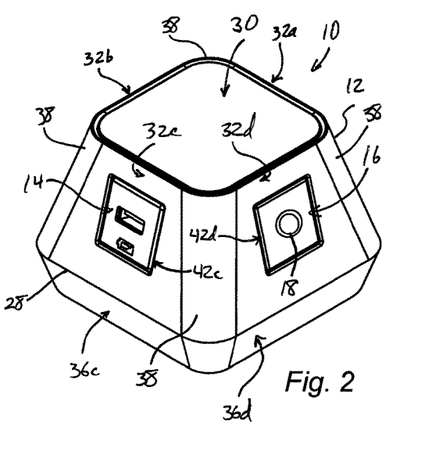
FIG. 2 is another perspective view of the portable electrical power unit of FIG. 1, as viewed from an opposite side.
Figure 3:
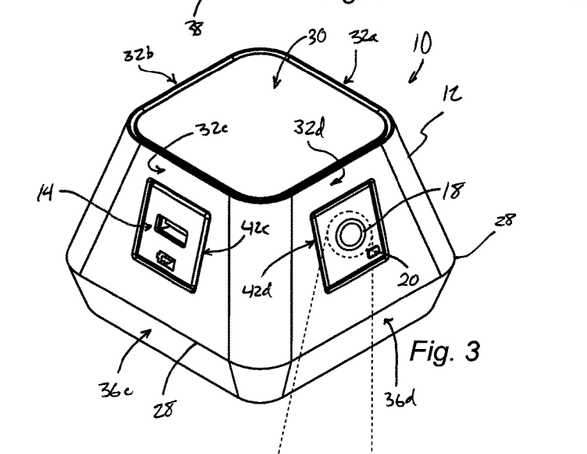
FIG. 3 is a perspective view of another portable electrical power unit similar to that of FIG. 2.
Figure 3A:
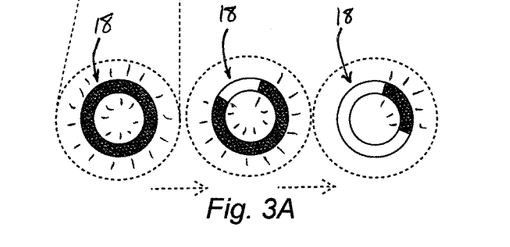
FIG. 3A shows enlarged views of a power level indicator of the portable electrical power unit of FIG. 3.

In the illustrated embodiment, charge level indicator 18 provides a visual indication of the charge level of the onboard electrical power source. In the illustrated embodiment, and as best shown in FIGS. 3 and 3A, charge level indicator 18 is shaped as an annular ring that illuminates in a manner to indicate the approximate charge level of the electrical power source. For example, and with reference to FIG. 3A, charge level indicator 18 may illuminate fully (FIG. 3A, at left) to indicate a fully charged battery or power source, and illuminates only partially, such as approximately 80% (FIG. 3A, at center) or approximately 30% (FIG. 3A, at right) to indicate the corresponding level of charge. For example, charge level indicator 18 may be made up of a plurality of LED lamps that can be individually energized and de-energized according to the detected power or charge level of the onboard battery or other power source. Although charge level indicator 18 is shown having an annular or ringed shape, it will be appreciated that other types of charge level indicators may be used without departing from the spirit and scope of the present invention, such as a linear or arcuate lighted indicator, a needle gauge, or even one or more audible tones to indicate one or more specific charge levels, or a color-changing liquid crystal strip of the type used on some household batteries.

Figure 4:
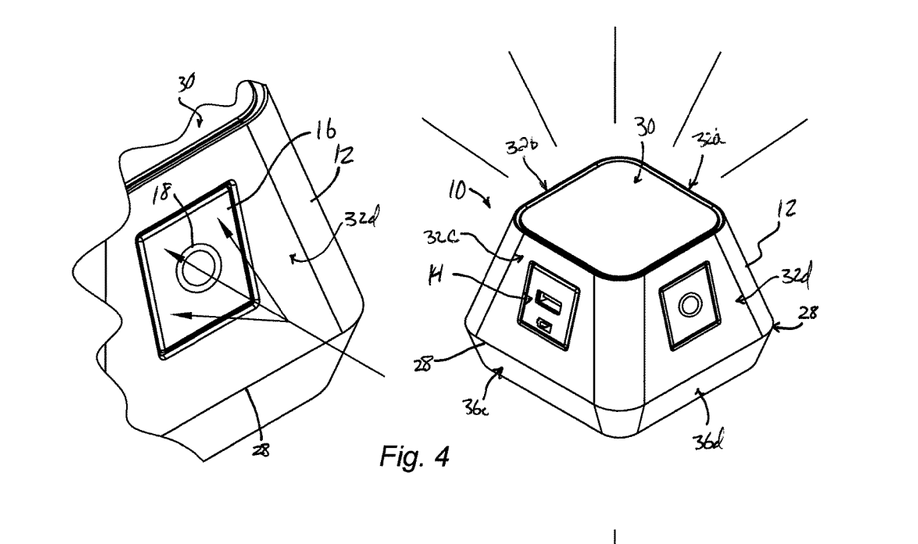
FIG. 4 is an enlarged partial perspective view and a full perspective view of the portable electrical power unit of FIG. 2, shown being turned on and then in an energized state.
Figure 5:
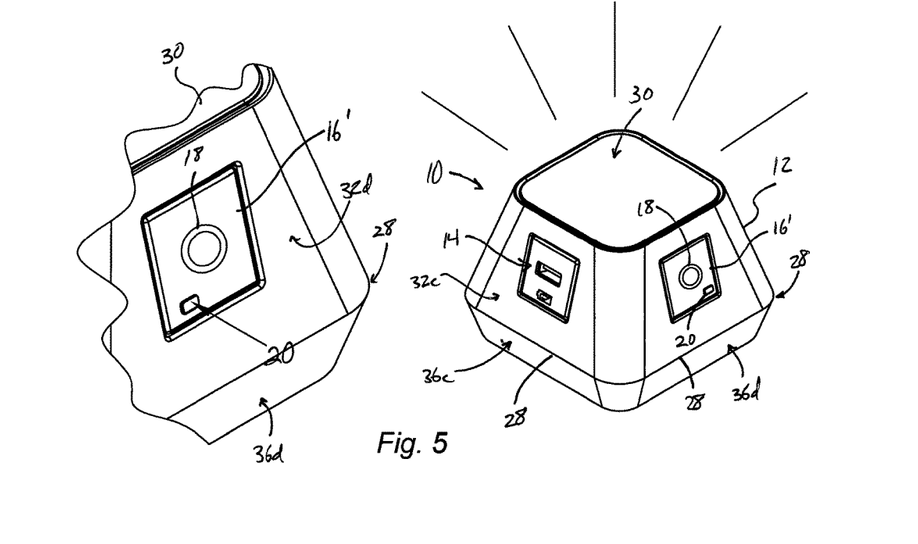
FIG. 5 is an enlarged partial perspective view and a full perspective view of the portable electrical power unit of FIG. 3, shown being turned on and then in an energized state.
Figures 6, 8:
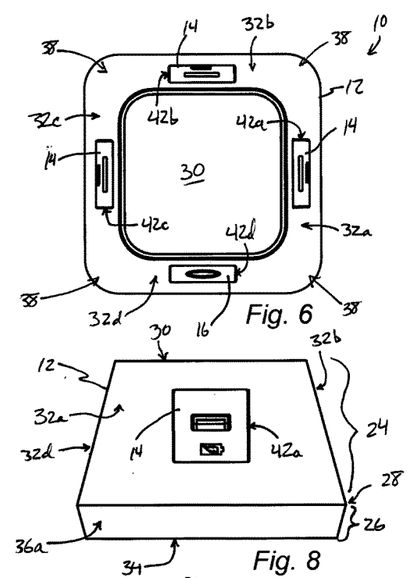
FIG. 6 is a top plan view of the portable electrical power unit of FIG. 1.
FIG. 8 is front elevation of the portable electrical power unit of FIG. 1.
Figures 7, 9:
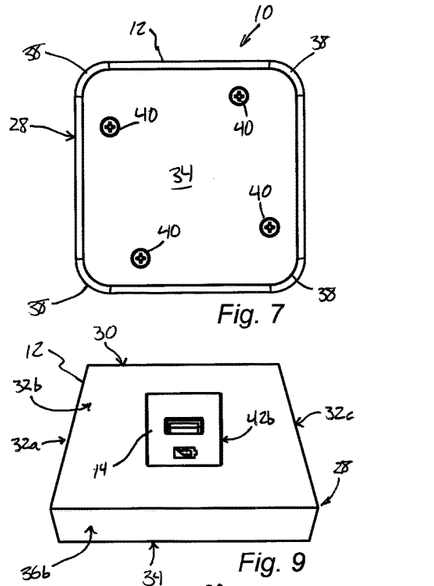
FIG. 7 is bottom plan view of the portable electrical power unit of FIG. 1.
FIG. 9 is a right side elevation of the portable electrical power unit of FIG. 1.
Figure 10:
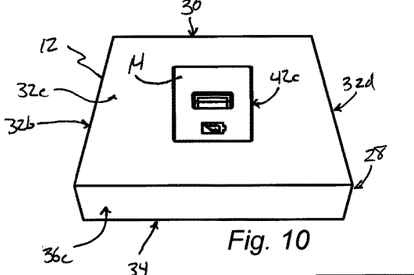
FIG. 10 is a left side elevation of the portable electrical power unit of FIG. 1.

Optionally, any exposed area of power switch 16 may be depressed by a user (such as shown in FIG. 4 at left) to energize electrical connectors 14 (such as shown in FIG. 4 at right). It is further envisioned that only a central region of switch 16, such as the circular region bounded by charge level indicator 18, may provide a resilient or spring-loaded push button switch that is intuitive to use. However, it is further envisioned that a separate push button 20 may be provided along a power switch 16' that includes charge level indicator 18, such as shown in FIGS. 3, 5 and 11B.

Figure 11A:
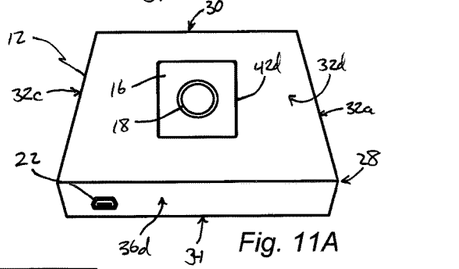
FIG. 11A is a rear elevation of the portable electrical power unit of FIG. 1.
Figure 11B:
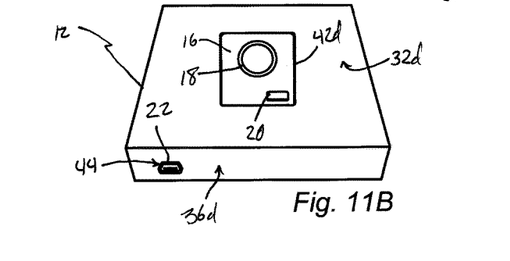
FIG. 11B is a rear elevation of the portable electrical power unit of FIG. 3.

Power unit 10 further includes a recharging interface in the form of a charging connector 22 that is spaced from electrical connectors 14 and power switch 16, and which is also accessible through housing 12, such as shown in FIGS. 11A and 11B. Charging connector 22 is in electrical communication with the onboard electrical power source, and is configured to receive an electrically energized charging connector (not shown) that may be used to supply electrical power to the onboard electrical power source, from a separate power supply such as an electrical wall outlet, to thereby recharge the onboard electrical power source of power unit 10. For example, charging connector 22 may be a micro USB connector.

Figure 21:
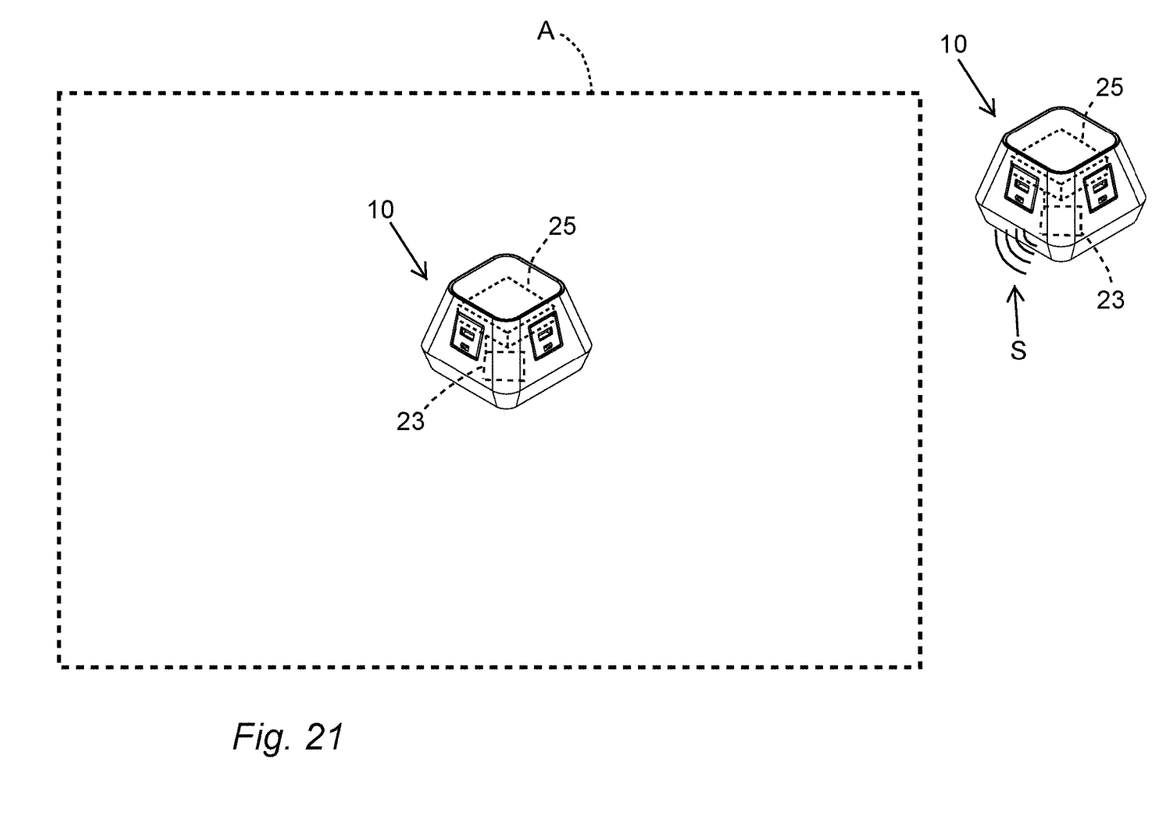
FIG. 21 is a perspective view of a pair of portable electrical power units inside and outside of a predefined area.

Optionally, and with reference to FIG. 21, the power unit may contain a location detection device 23 that can detect and generate a corresponding signal S upon removal of the power unit from a predefined area A. For example, the location detection device may be a built-in circuit, an RFID chip, or the like, which may be in constant electrical communication with the onboard battery or power source 25 (i.e., independent of switch position), to detect when the power unit is removed from an area, in which case an audible alert may sound and/or the power unit may deactivate itself. This function may be useful for restaurants, commercial vehicle operators, and other establishments or the like that maintain multiple power units for the occasional use by patrons or customers. Optionally, the power unit may contain circuitry for providing different voltage outputs at different connectors, which would be labeled accordingly and/or configured to limit or prevent access by incompatible connectors.

Housing 12 has an upper region 24 and a lower region 26 that meet at a beltline 28, which defines the widest perimeter of housing 12, such as shown in FIGS. 8-11B. Upper region 24 includes a top or upper surface 30 and four upper side surfaces 32a-d that extend downwardly while sloping laterally outwardly from upper surface 30. Similarly, lower region 26 includes a bottom surface 34 with four lower side surfaces 36a-d extending upwardly and sloping laterally outwardly from bottom surface 34. Housing 12 further includes curved corner regions 38 disposed between adjacent ones of the upper side surfaces 32a-d and lower side surfaces 36a-d. Each of the upper side surfaces 32a-d meets a respective one of lower side surfaces 36a-d at beltline 28. Although housing 12 is shown and described as having four upper side surfaces and four lower side surfaces, it will be appreciated that other shapes are also possible, such as a three-sided or five- or six-sided shape, without departing from the spirit and scope of the present invention.

Bottom surface 34 may be removable via threaded screws 40 (FIG. 7), which engage respective bores formed inside housing 12, such as in the form of hollow cylinders extending downwardly from upper surface 30 along an interior of upper region 24. In the illustrated embodiment, top surface 30, upper side surfaces 32a-d, bottom surface 34, and lower side surfaces 36a-d are all substantially planar, although other rounded and/or multi-faceted shapes are envisioned. Optionally, top surface 30 is part of an interchangeable cover, such as described in commonly-owned U.S. Pat. No. 9,000,298 entitled INTERCHANGEABLE COVER SYSTEM, which is hereby incorporated herein by reference in its entirety.

Each upper side surface 32a-d defines a respective square opening 42a-d in which any one of the electrical connectors 14 or the switch 16 is placed. It will be appreciated that when each square opening 42a-d is placed in the same location along its respective upper side surface 32a-d, as shown, electrical connectors 14 and switch 16 can be mounted to bottom surface 34, along with the battery or power source, and inserted into the housing interior in any of the four different rotational orientations, and secured in place with threaded fasteners 40. However, it will further be appreciated at the placement of the electrical outlet openings 42a-c and switch opening 42d along the housing 12 may be changed or varied as desired, without departing from the spirit and scope of the present invention.

When power unit 10 is equipped with charging connector 22, a separate opening 44 is provided in housing 12 for access. In the illustrated embodiment, and as shown in FIGS. 11A and 11B, charging connector opening 44 is formed or established in lower side surface 36d, below switch 16 and switch opening 42d. In this case, bottom surface 34 may be configured to fit into the upper portions of housing 12 in only one orientation, and various housing surfaces may be keyed to prevent assembly in an incorrect orientation. Removable bottom surface 34 also facilitates replacement of the onboard battery or other power source, and/or the changing of one or more electrical connectors as desired. Optionally, bottom surface 34 may be fitted with anti-slip pads, double-sided tape, a magnet, one portion of a hook-and-loop fastener, or the like, so as to provide some increased level of securing or retention of housing 12 relative to a surface on which it is supported.

Figure 12:
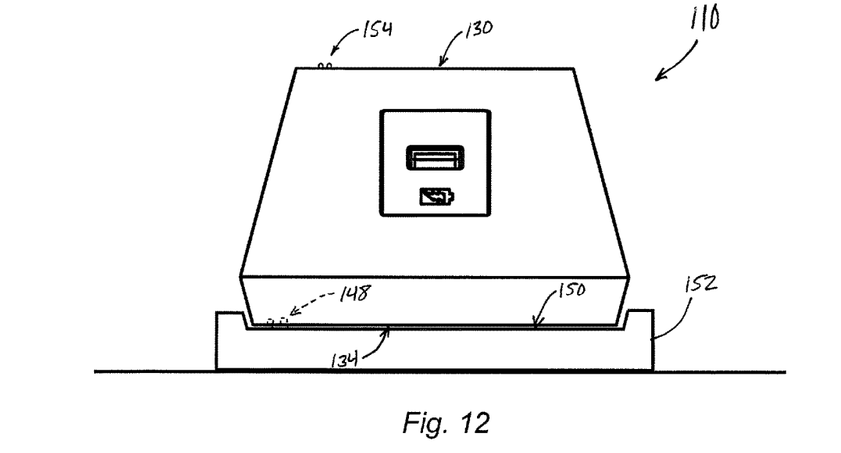
FIG. 12 is a right side elevation of another portable electrical power unit in accordance with the present invention, shown supported in a charging cradle.
Figure 14:
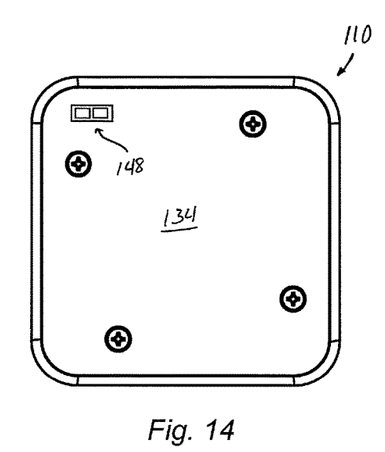
FIG. 14 is a bottom plan view of the portable electrical power unit of FIG. 12.
Figure 15:
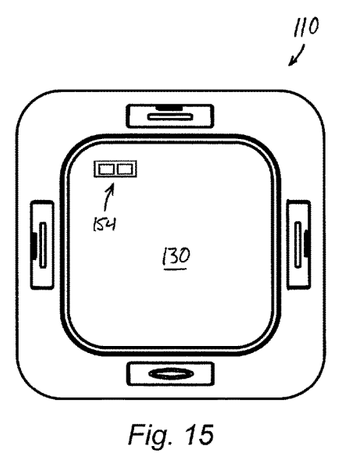
FIG. 15 is a top plan view of the portable electrical power unit of FIG. 12.

It will be appreciated that the portable electrical power unit may be configured to be recharged via an electrical power input interface when placed in a charging cradle or zone, and may further be configured to convey electrical power, via an electrical power output interface, to a portable electronic device such as a mobile phone or a hand-held media player that is placed atop the unit. For example, and with reference to FIGS. 12, 14 and 15, a portable electrical power unit 110 has a recharging interface in the form of a pair of electrical input contacts 148 at its bottom surface 134, which are engaged by a corresponding pair of electrical contacts (not shown) at a receiving surface 150 of a charging cradle 152 (FIG. 12). Optionally, a connector similar to USB charging connector 22 may be positioned at bottom surface 134. Charging cradle 152 is equipped to provide appropriate power output, such as low voltage DC power, to charge an onboard electrical power source (e.g., a battery or capacitor) of electrical power unit 110, and may include an electrical transformer for converting a high voltage AC power input to a low voltage DC power output at receiving surface 150.

Power unit 110 further includes a pair of electrical output contacts 154 at its upper surface 130 (FIGS. 12 and 15), for supplying electrical power to a portable electronic device that is placed atop power unit 110. Electrical output contacts 154 are arranged or configured to engage the electrical contacts of a particular electronic device, but it is envisioned that one or more different arrangements or configurations of electrical contacts may be used, such as to ensure greater compatibility with a range of electronic devices. Optionally, the electrical output contacts may be installed on a replaceable insert having a common base for engaging electrical contacts inside the power unit's housing, with different inserts having different configurations of electrical output contacts for compatibility with different electronic devices. It is further envisioned that a "charging skin" having a plurality of elongated low voltage electrical contacts of alternating polarity may be provided at upper surface 130, so that compatible electronic devices may be placed in different orientations along upper surface 130 to receive electrical power. Charging skins and the like are described in more detail in commonly-owned U.S. Pat. No. 8,951,054, as well as in commonly-owned and co-pending U.S. patent application Ser. No. 14/501,165, filed Sep. 30, 2014 and corresponding to U.S. Publication No. 2015/0091522, which are hereby incorporated herein by reference in their entireties.

Figure 13:
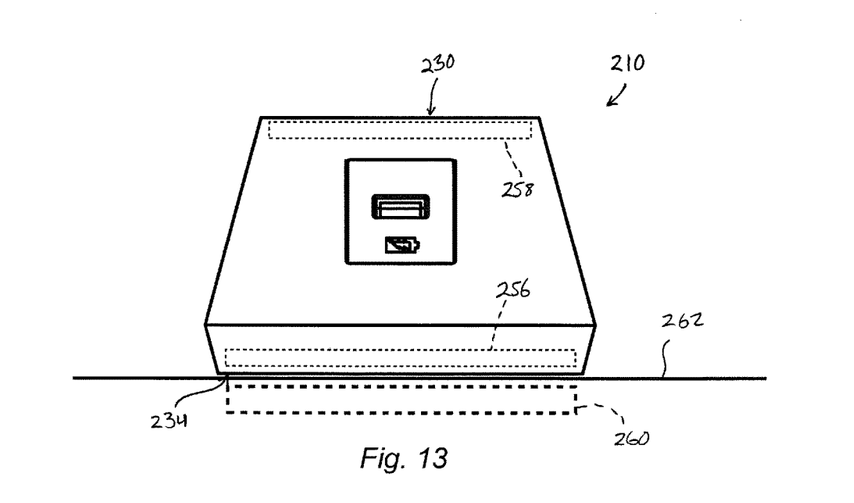
FIG. 13 is a right side elevation of another portable electrical power unit in accordance with the present invention, shown resting on a support surface having an inductive charger.
Figure 16:
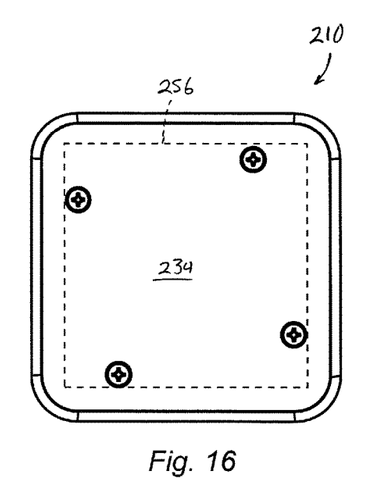
FIG. 16 is a bottom plan view of the portable electrical power unit of FIG. 13.
Figure 17:
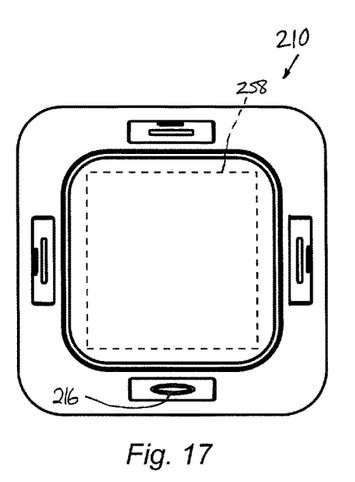
FIG. 17 is a top plan view of the portable electrical power unit of FIG. 13.

Referring to FIGS. 13, 16 and 17, another portable electrical power unit 210 includes a recharging interface in the form of an inductive electrical power receiver 256 at its bottom surface 234, and an inductive electrical power transmitter 258 at its upper surface 230. Portable electrical power unit 210 is functionally similar to portable electrical power unit 110, discussed above, except that electrical power unit 210 utilizes non-contact inductive charging or power transmission technology instead of direct-contact power transmission. Electrical devices having non-contact inductive charging or power transmission technology are discussed in more detail in commonly-owned and co-pending U.S. patent application Ser. No. 14/501,158, filed Sep. 30, 2014 and corresponding to U.S. Publication No. 2015/0091389, which is hereby incorporated herein by reference in its entirety.

Electrical power receiver 256 is positionable in close proximity to an inductive electrical power transmitter or charger 260 located within or along a surface 262 on which electrical power receiver 210 is supportable (FIG. 13). Thus, by simply placing electrical power unit 210 along surface 262 above inductive electrical power transmitter 260, the onboard electrical power source may be charged when the inductive electrical power transmitter 260 is energized, without any exposed electrical contacts. Inductive electrical power transmitter 258 may be energized constantly (i.e., whenever the onboard battery hold sufficient charge) or only in response to a switch 216 being activated, and may be energized while the onboard electrical power source is simultaneously being charged.

It will be appreciated that another portable electrical power unit may have a combination of direct electrical contacts and inductive electrical power transmitter and/or inductive electrical power receiver, without departing from the spirit and scope of the present invention. For example, a portable electrical power unit may be equipped with an inductive electrical power receiver at its bottom surface, and direct-contact electrical contacts at its upper surface, or vice versa. Another portable electrical power unit may have both an inductive electrical power receiver and direct electrical contacts at its bottom surface, and both an inductive electrical power transmitter and direct electrical contacts at its upper surface. Such arrangements provide added flexibility and options for recharging the onboard battery or other power storage device, and for supplying electrical current to other devices from the onboard battery or power storage device. It will be appreciated that all electrical contacts, receptacles, and/or inductive electrical power transmission devices may be energized or de-energized, activated or de-activated, in response to one or more switches, such as in the manner described above.

Figure 18:
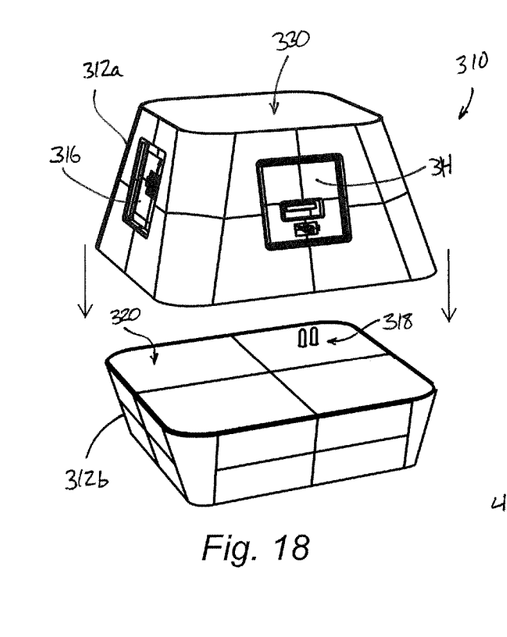
FIG. 18 is a perspective view of another portable electrical power unit in accordance with the present invention, shown prior to coupling an upper receptacle portion to a removable base portion.
Figures 19, 20:
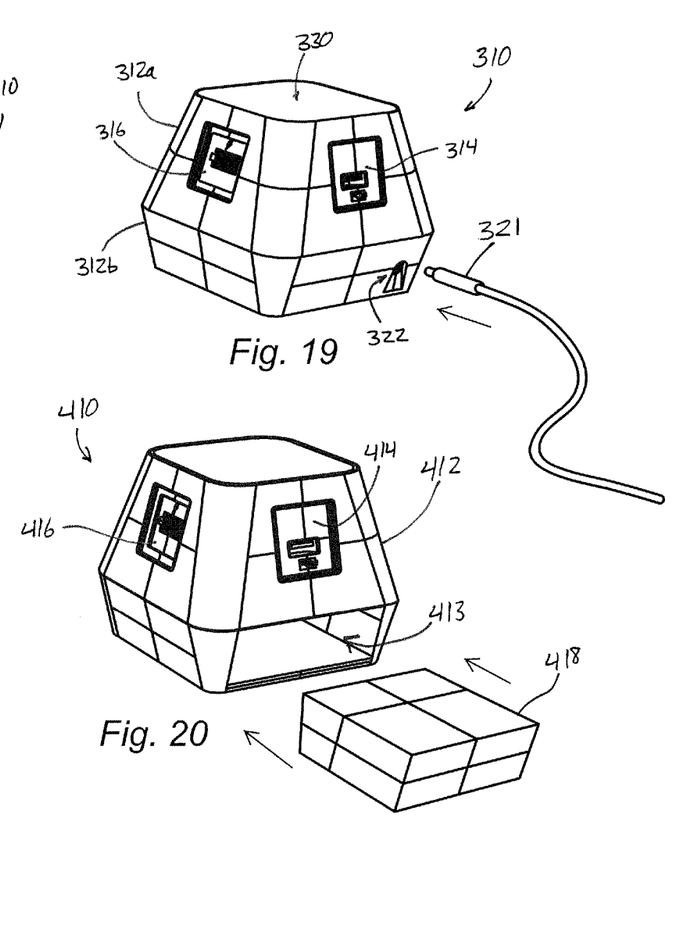
FIG. 19 is a perspective view of another portable electrical power unit similar to that of FIGS. 1-11B.
FIG. 20 is a perspective view of another portable electrical power unit in accordance with the present invention, depicting slide-in insertion of an energy storage device.

Optionally, a portable electrical power unit 310 may be configured with an upper housing 312a that is separate from a lower housing 312b contains a rechargeable battery pack or other electrical energy storage device, such as shown in FIGS. 18 and 19. Upper housing 312a includes at least one electrical connector 314, such as a low voltage USB connector (shown), mini-USB, or micro-USB, and may include two or more electrical connectors of the same or different configurations, as desired. A charge level indicator and/or power switch 316 is provided along one of the exterior sidewalls of upper housing 312a. An upper surface 330 of upper housing 312a may include electrical power transmission technology such as electrical contacts (similar to the optional electrical output contacts 154 of power unit 110), or wireless or non-contact power transmission such as an inductive coil (similar to the optional inductive electrical power transmitter 258 of power unit 210). A lower surface (not shown) of the upper housing 312 has a pair of electrical input contacts for establishing an electrical connection to a pair of electrical output contacts 318 at an upper surface 320 of lower housing 312b. Electrical output contacts 318 are in communication with the battery or other electrical energy storage device contained in lower housing 312b, to thereby convey power from the battery in the lower housing 312b to the outlets at the upper housing 312a.

Upper surface 320 of lower housing 312b, and the lower surface of upper housing 312a, have complementary latching or securing elements (not shown) that engage one another to secure the upper and lower housings 312a, 312b together during use of power unit 310. It is envisioned that substantially any mechanical latching or securing elements could be used for securing the upper and lower housings, such as resilient latch tabs, hook-and-loop fasteners, snap-buttons or other interlocking components, spring-loaded latches, magnets, or the like. The separability of lower housing 312b from upper housing 312a facilitates quick-changing of depleted battery packs for freshly charged packs, so that the outlets of upper housing 312a can be kept available for use simply by trading interchangeable lower housings 312b.

When lower housing 312b is secured to upper housing 312a, electrical output contacts 318 (which may be spring-loaded) establish an electrical connection to the corresponding electrical input contacts at the lower surface of upper housing 312a, and the secured housings 312a, 312b may be moved together as a unit. When lower housing 312b is separated from upper housing 312a, the lower housing 312b may be moved to a charging location such as a charging base or cradle (similar to charging cradle 152, described above), in order to recharge the battery for future use. Such charging may be done through contacts 318, or through additional contacts provided specifically for that purpose, similar to the electrical input contacts 148 at the bottom surface 134 of portable electrical power unit 110. Optionally, it is envisioned that charging may be accomplished wirelessly, such as with non-contact power transmission, similar to inductive electrical power receiver 256 of power unit 210. It is further envisioned that the battery or other electrical energy storage device contained in lower housing 312b may optionally be recharged while still attached to upper housing, such as using a charging plug 321 that engages a recharging interface in the form of a charging connector or receptacle 322 (FIG. 19), in substantially the same manner of charging connector 22, described above.

According to another embodiment, a portable electrical power unit 410 includes a one-piece housing 412 having an opening 413 formed in one of its lower side surfaces, such as shown in FIG. 20. Opening 413 is sized and shaped to receive a battery pack 418 that, once fully engaged in housing 412, establishes an electrical connection to the circuitry associated with an electrical connector 414 and a charge level indicator and/or power switch 416 that are located in an upper region of power unit 410. Battery pack 418 may be releasably secured in housing 412 using a latch mechanism (not shown) or any suitable securing device or structure, and is removable for recharging. This also allows for rapid replacement of a depleted battery pack with a charged battery pack, to thereby minimize any out-of-service time for the power unit 410 during times when it is desired for use.

Accordingly, the portable electrical power units of the present invention provide readily transportable and self-contained power supplies that are capable of charging mobile phones and other small electronic or electrical devices, and which may be particularly well suited for use by patrons or customers of commercial establishments or work areas in which a temporary low voltage power supply is occasionally needed, and yet it is not necessarily desirable or cost effective to provide a dedicated low voltage wiring system in the area where such power is occasionally desired. The power unit is compact and rechargeable, and may provide one or more different types of electrical connectors for compatibility with different types of devices, and may further include a power switch for selectively energizing and de-energizing the outlets, while also providing a visual indication of the current charge level of the internal battery or onboard power source.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A portable electrical power unit configured to be supported on a desk or table, said power unit comprising:

a housing defining an interior region, said housing comprising an upper region and a lower region, said upper region having a top surface and at least three upper side surface portions extending downwardly from said top surface, and said lower region having a bottom surface and at least three lower side surfaces extending upwardly from said bottom surface;

wherein a first of said upper side surface portions faces in a first direction, and a second of said upper side surface portions faces in a second direction that is angled at least about 90 degrees relative to the first direction;

first and second electrical outlet openings disposed in said first and second upper side surface portions, respectively, and a charge level indicator opening disposed in said third upper side surface portion;

first and second electrical receptacles mounted in said interior region and accessible through respective ones of said first and second outlet openings, wherein said first and second electrical receptacles are each interchangeably mounted in either of said first and second outlet openings;

a rechargeable electrical power source mounted in said interior region and in electrical communication with said first and second electrical receptacles;

a recharging interface disposed at said lower region of said housing, wherein said recharging interface is in electrical communication with said rechargeable electrical power source and is operable to receive electrical current from an external power source for recharging said rechargeable electrical power source; and a charge level indicator positioned in said charge level indicator opening and operable to provide a visual indication of a charge level of said rechargeable electrical power source.

2. The power unit of claim 1, wherein said at least three upper side surfaces slope laterally outwardly below said top surface, and said at least three lower side surfaces slope laterally outwardly above said bottom surface.

3. The power unit of claim 2, wherein said at least three upper side surfaces comprise four upper side surfaces, and said at least three lower side surfaces comprise four lower side surfaces, and wherein said power switch is positioned along a third of said upper side surface portions, wherein said third upper side surface portion faces in a third direction that is angled at least about 90 degrees relative to the first direction and the second direction.

4. The power unit of claim 1, further comprising a manually-actuated power switch accessible at said housing and operable to selectively energize and de-energize said first and second electrical receptacles, wherein said charge level indicator comprises an annular ring that is operable to illuminate a selected portion thereof to indicate a charge level of said rechargeable electrical power source.

5. The power unit of claim 4, wherein said power switch comprises a depressible central region of said annual ring.

6. The power unit of claim 1, wherein said bottom surface of said housing comprises a panel that is removable to expose said interior region and said rechargeable electrical power source, and wherein said top surface comprises an interchangeable aesthetic cover forming an uppermost surface of said power unit.

7. The power unit of claim 1, wherein said recharging interface comprises a direct-contact charging connector spaced from said first and second electrical receptacles and accessible through said housing, wherein said charging connector is configured to receive an electrically energized charging connector associated with the external power source.

8. The power unit of claim 1, wherein said recharging interface comprises a direct-contact charging connector at said bottom surface, wherein said direct-contact charging connector is configured to engage an electrically energized charging connector associated with the external power source.

9. The power unit of claim 1, wherein said recharging interface comprises a non-contact electrical power receiver configured to receive electrical energy from a non-contact electrical power transmitter associated with the external power source.

10. The power unit of claim 9, wherein said recharging interface comprises an inductive coil.

11. The power unit of claim 1, further comprising an electrical power output interface at said top surface.

12. The power unit of claim 11, wherein said electrical power input interface comprises at least one chosen from direct electrical contacts and a non-contact electrical power transmitter.

13. The power unit of claim 12, wherein said first and second electrical receptacles comprise low voltage DC receptacles.

14. The power unit of claim 13, wherein at least one of said low voltage DC receptacles comprises a USB connector.

15. The power unit of claim 1, further comprising a location detection device in electrical communication with said rechargeable electrical power source, independent of whether said first and second electrical receptacles are energized, wherein said location detection device is operable to detect and generate a corresponding signal upon removal of said power unit from a predefined area.

16. A portable electrical power unit configured to be supported on a desk or table, said power unit comprising:

a housing defining an interior region, said housing comprising an upper region and a lower region, said upper region having a top surface and four substantially planar upper side surface portions extending downwardly and each sloping laterally outwardly from said top surface, and said lower region having a bottom surface and four substantially planar lower side surfaces extending upwardly and each sloping laterally outwardly from said bottom surface, wherein each of said upper and lower side surface portions faces a different direction;

an opening formed in each of said upper side surface portions;

at least three electrical receptacles mounted in said interior region, wherein said electrical receptacles are interchangeably mountable in three or more of said openings formed in said upper side surface portions and are accessible through said openings;

a charge level indicator mounted in a fourth of said openings and operable to provide a visual indication of a charge level of said rechargeable electrical power source;

a rechargeable electrical power source mounted in said interior region and in electrical communication with said power switch and in selective communication with each of said at least three electrical receptacles;

a recharging interface disposed at said lower region of said housing, wherein said recharging interface is in electrical communication with said rechargeable electrical power source and is operable to receive electrical current from an external power source for recharging said rechargeable electrical power source;

an interchangeable aesthetic cover coupled to said top surface and forming an uppermost surface of said power unit; and wherein said bottom surface of said housing comprises a panel that is removable to expose said interior region and said rechargeable electrical power source.

17. The power unit of claim 16, further comprising a manually actuated power switch mounted in said interior region and accessible through a fourth of said openings, wherein said power switch is operable to simultaneously energize and de-energize said at least three electrical receptacles, wherein said charge level indicator comprises an annular ring that is operable to illuminate a selected portion thereof to indicate a charge level of said rechargeable electrical power source, and wherein said power switch comprises a depressible central region of said annual ring.

18. The power unit of claim 16, wherein said lower region of said housing comprises a removable housing portion that contains said rechargeable electrical power source.

19. The power unit of claim 16, further comprising a location detection device in electrical communication with said rechargeable electrical power source, independent of whether said at least three electrical receptacles are energized via said switch, wherein said location detection device is operable to detect and generate a corresponding signal upon removal of said power unit from a predefined area.

* * * * *